United States Patent
Aarestrup

(12) 
(10) Patent No.: US 6,373,728 B1
(45) Date of Patent: Apr. 16, 2002

(54) FREQUENCY CONVERTER WITH AN INTERMEDIATE BUCK-BOOST CONVERTER FOR CONTROLLING AN ELECTRIC MOTOR

(75) Inventor: Jan Carøe Aarestrup, Bjerringbrø (DK)

(73) Assignee: Grundfos A/S, Bjerringbro (DK)

( * ) Notice: Subject to any disclaimer, the term of this patent is extended or adjusted under 35 U.S.C. 154(b) by 0 days.

(21) Appl. No.: 09/671,218

(22) Filed: Sep. 27, 2000

(30) Foreign Application Priority Data

Sep. 27, 1999 (DE) ............................ 199 46 242

(51) Int. Cl.[7] .................................. H02M 5/458
(52) U.S. Cl. .................................. 363/37; 363/89
(58) Field of Search ..................... 363/34, 37, 89, 363/132

(56) References Cited

U.S. PATENT DOCUMENTS

| | | | |
|---|---|---|---|
| 5,235,504 A | * | 8/1993 | Sood ............................ 363/89 |
| 5,808,884 A | * | 9/1998 | Teggatz et al. .............. 363/132 |
| 5,872,703 A | * | 2/1999 | Williams et al. ............ 363/132 |
| 5,952,856 A | * | 9/1999 | Horiguchi et al. ............. 363/98 |
| 6,121,800 A | * | 9/2000 | Leighton et al. ............. 363/132 |

FOREIGN PATENT DOCUMENTS

| | | | |
|---|---|---|---|
| DE | 26 52 275 | 5/1978 | .......... H02M/7/155 |
| DE | 30 44 056 | 6/1993 | .......... H02K/29/06 |
| DE | 43 40 604 | 3/1995 | ............ H02M/1/12 |
| GB | 2 244 875 | 12/1991 | ........... H02P/7/635 |

\* cited by examiner

*Primary Examiner*—Jeffrey Sterrett
(74) *Attorney, Agent, or Firm*—Cohen, Pontani, Lieberman & Pavane

(57) ABSTRACT

The frequency converter is provided for an electric motor and comprises a rectifier, an intermediate circuit and an inverse rectifier which are connected with respect to circuiting technology via a control and regulation circuit. In the inverse rectifier to each motor phase there are allocated at least two electronic switches, one for the side conducting the higher potential and one for the side conducting the low potential. The intermediate circuit is formed as an active intermediate circuit and contains a Buck-Booster converter. It is controlled such that the voltage at the output of the intermediate circuit with respect to magnitude is always smaller than that at the input. By way of this inexpensive components may be used in the inverse rectifier and in particular also in the control and regulation circuit.

6 Claims, 3 Drawing Sheets

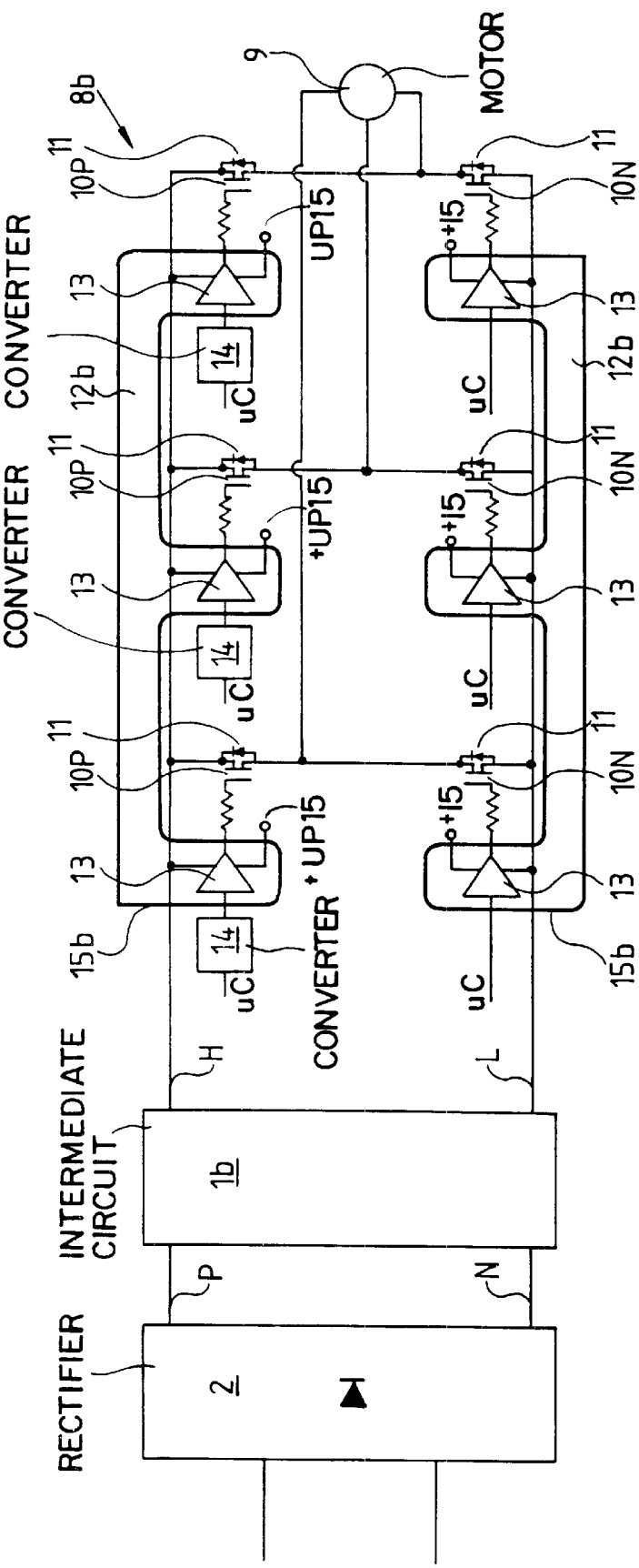

FREQUENCY CONVERTER WITH AN INTERMEDIATE BUCK-BOOST CONVERTER FOR CONTROLLING AN ELECTRIC MOTOR

BACKGROUND OF THE INVENTION

1. Field of the Invention

The present invention relates to a frequency converter for an electric motor having a rectifier, an intermediate circuit, an inverse rectifier, and a control and regulation circuit.

2. Description of the Prior Art

The application of frequency converters for electric motors is of increasing importance for motors of a smaller power. The manufacturing costs for the frequency converter always still form a decisive criterium for its application. One therefore strives to simplify the construction of the frequency converter or to select this construction such that components may be used which are as inexpensive as possible.

With frequency converters for electric motors one differentiates essentially between two construction types, specifically the pulse-width-modulated frequency converter (PWM frequency converter) and the pulse-amplitude-modulated frequency converter (PAM frequency converter). Both not only change the frequency of the voltage lying at the motor but also the voltage itself to control the rotational speed of the motor with low losses and to be able to operate the motor with an essentially constant torque, specifically the motor voltage and motor frequency must be changed proportionally.

PAM Frequency converters consist essentially of a rectifier in which a single phase or multi-phase alternating current is rectified, of an intermediate circuit (also called direct voltage intermediate circuit) in which the constant direct voltage of the rectifier by way of an electronic switch is switched on and off in order thus to produce a direct current changeable with respect to magnitude, of an inverse rectifier and of a control and regulation circuit. In order to change the constant direct voltage lying at the exit of the rectifier, in particular to also to increase this, within the intermediate circuit there is provided a so-called Buck-Boost converter which contains a Buck-Boost rectifier diode as well as the already mentioned electronic switch. In the inverse rectifier then the variable direct voltage produced in the intermediate circuit by way of electronic switches is connected to the motor windings such that by way of a suitable control activation of the switches a frequent voltage supply of the motor is achieved, wherein by way of the selection of the frequency the rotational speed of the motor is controlled. With this to each motor phase there are allocated two electronic switches. One of the switches is connected to the higher potential (High-Side) and the other to the lower potential (Low-Side) in order thus for the respective motor phase to produce an alternating voltage. The control of the switches in the inverse rectifier as well as of the switch in the intermediate circuit is effected by way of the control and regulation circuit which with known PAM frequency converters is quite costly. The control is costly because the switch of the Buck-Boost converter as well as usually at least the n-type doping transistors sitting on the High-Side of the inverse rectifier are so seated in the voltage-conducting leads to the motor that their reference voltage constantly changes corresponding to the motor control activation. Since for switching these electronic switches a control voltage is required which lies above the reference voltage by a defined amount, in the control and regulation circuit for each of these switches the voltage must be suitably followed which is expensive with regard to circuit technology.

BRIEF SUMMARY OF THE INVENTION

Against this background it is the object of the invention to provide frequency converter having reduced manufacturing cost over the prior art.

According to the present invention, the object is achieved by a frequency converter for an electric motor including a rectifier, an intermediate circuit having a buck-boost converter, an inverse rectifier and a control circuit. The intermediate circuit receives an output of the rectifier. The inverse rectifier has a high-side conducting a higher potential and a low-side conducting a lower potential and a pair of electronic switches for each phase of the electric motor. One of the pair of switches is connected to the high side and the other of the pair of switches is connected to the low side.

The basic concept of the invention is to control the intermediate circuit such that the output voltage of the intermediate circuit is always smaller than the output voltage of the rectifier.

Such a control activation according to the present invention is contrary to the known intermediate circuit, because the known intermediate circuit with a Buck-Boost converter indeed is applied exactly for the reason of increasing the output voltage of the intermediate circuit also beyond the output voltage of the rectifier. This control activation according to the present invention however permits the application of inexpensive electronic switches and beyond this permits a considerably simpler construction of the control and regulation circuit.

The solution according to the present invention permits the switches of the inverse rectifier, on the side conducting the higher potential to comprise p-type doping semiconductors and on the side conducting the lower potential to comprise n-type doping semiconductors, with known inverse rectifiers according to the state of the art only n-type doping semiconductors are applied since specifically the p-type doping transistors may only be applied up to approx. 150 Volts. The n-type doping semiconductors which are also applied on the High-Side in the known inverse rectifier not only have the disadvantage that they are significantly more expensive than the p-type doping but with the application on the High-Side the n-type doping semiconductors have the disadvantage that they are connected to the further motor winding such that their reference voltage constantly changes which has the result that the voltage required for the switching must be correspondingly followed. The present invention thus permits the application of inexpensive p-type doping semiconductors on the High-Side of the inverse rectifier which furthermore considerably simplifies the control actuation of these electronic switches, since no voltage following for the turn-on voltage is required. This applies in a similar manner to the switch of the Buck-Boost converter which is why it is particularly advantageous when this electronic switch of the Buck-Boost converter is arranged one side of the intermediate circuit and the Buck-Booster diode usually arranged in the Buck-Booster converter is arranged on the other side of the intermediate circuit. Then specifically it is possible to control activate the switches in a simple manner with a constant turn-on voltage, wherein the switch preferably lies on the side of the Buck-Boost converter which impinges the Low-Side at the output, and the diode on the other side, which forms the High-Side at the output. The control and regulation circuit may then thus likewise be constructed relatively simply for this switch.

The application of a Buck-Boost converter in the intermediate circuit firstly appears to be contradictory when the voltage at the exit of the rectifier is not to be increased at all but if anything is to be reduced in magnitude. This voltage reduction, apart from the above mentioned advantages, has a very considerable further advantage which in particular comes to fruition when the frequency converter is envisaged for motors of a lower power, i.e. between for example 50 and 300 Watts. If such motors are designed for a frequency converter operation, i.e. wound as for example three-phase asynchronous motors, then one meets problems with regard to manufacturing technology on account of the then resulting extremely thin wire thicknesses which likewise may be compensated with the frequency converter according to the invention. Since on account of the low voltage with the optimization of the present motor for this frequency converter with the same power, there must flow a larger current, the wire thickness must also be selected larger which in this particular case is advantageous.

Furthermore the voltage reduction in the intermediate circuit also has the advantage that the components in the intermediate circuit and inverse rectifier as well as in the control and regulation circuit instead of the usual 400 Volts must only have a disruption strength of for example 50 Volts, which means the application of less expensive and smaller components. Thus for example also the passive components such as capacitors, coils and resistances may be designed less expensively.

A further advantage of the frequency converter according to the invention in particular to be seen on the part of the motor manufacturer is that one and the same apparatus may be operated with mains supply of a differing supply voltage and/or frequency. Also an operation with a direct current mains supply is possible which for example permits the application in vehicles and boats. Thus the frequency converter according to the invention is preferably also applicable in combination with a pulse-amplitude-modulated controlled, brush less, direct current motor for driving a centrifugal pump. The application of the Buck-Boost converter, unusual already for reasons of cost, in the intermediate circuit furthermore has the advantage that a continuous power output of the frequency converter is effected at the motor, i.e. that the interruptions in the power uptake otherwise occurring with alternating current motors do not occur with the zero crossing. Furthermore the switch of the Buck-Boost converter may advantageously also be used for suppressing the idle current and idle power, which in particular is already prescribed with motors of a smaller power today in many countries.

BRIEF DESCRIPTION OF THE DRAWINGS

The invention is hereinafter described in more detail by way of an embodiment example shown in the drawing. There are shown:

FIG. 3 is a simplified circuit diagram of a frequency converter according to the prior art and FIG. 4 is a simplified schematic circuit diagram of a frequency converter according to the present invention.

DETAILED DESCRIPTION OF THE INVENTION

The figures show both prior art embodiments and embodiments according to the present invention. Components which exhibit differences between the prior art and present invention comprise a suffix 'a' for the prior art and a suffix 'b' for the present invention.

Figure 1:
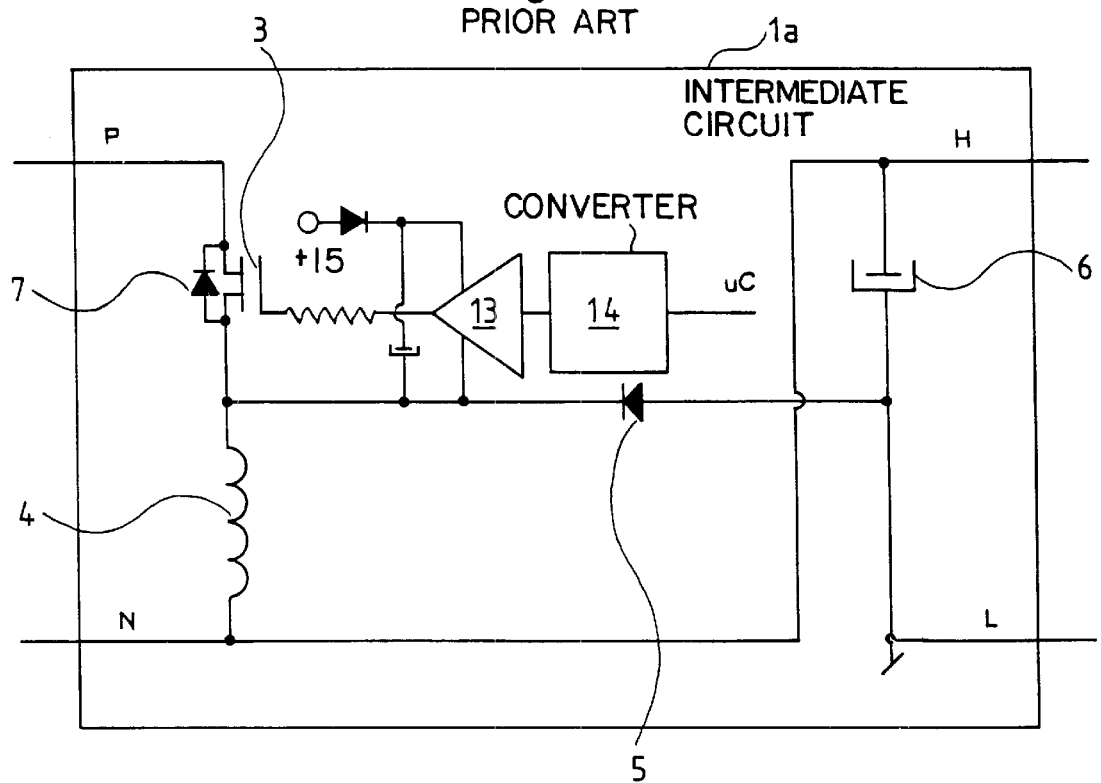
FIG. 1 the simplified schematic circuit diagram of an intermediate circuit according to the prior art.
Figure 3:
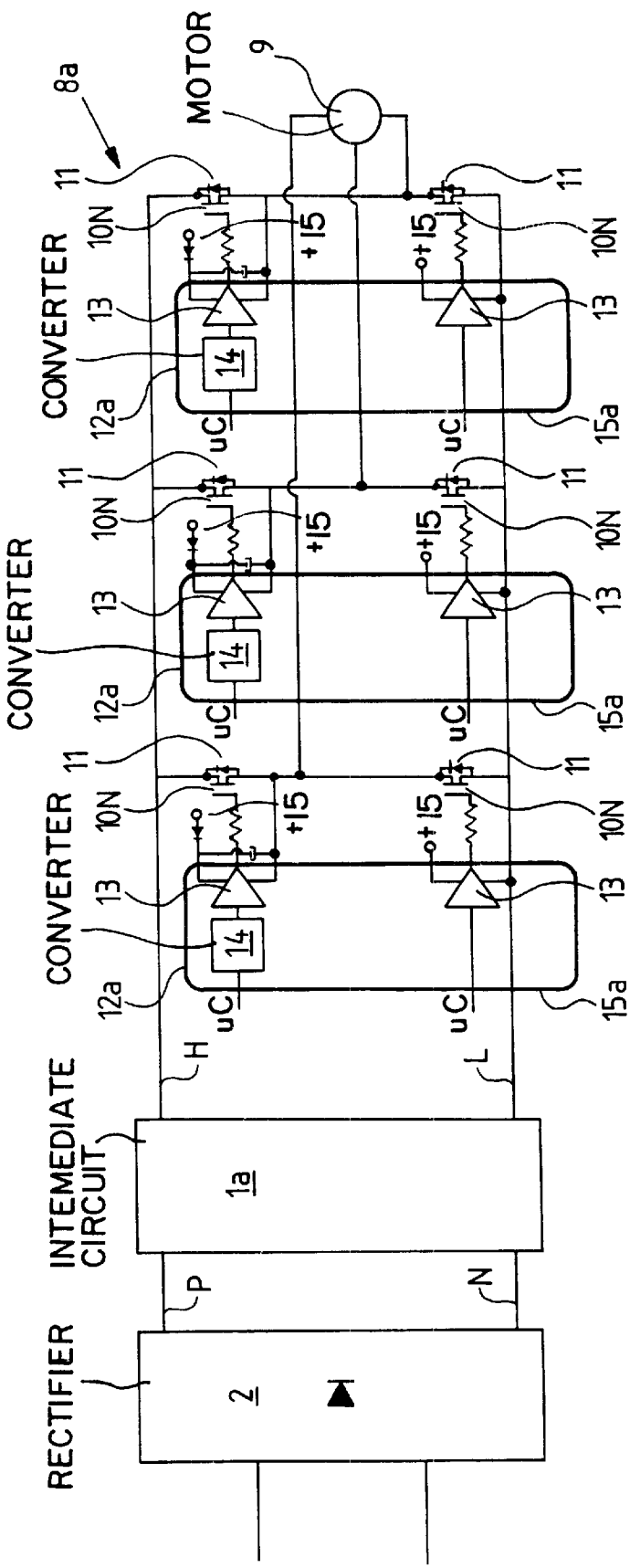

FIG. 1 shows an intermediate circuit 1a of a frequency converter according to the prior art constant direct voltage is admitted to the intermediate circuit 1a by a rectifier 2 (see FIG. 3). The input of the intermediate circuit is indicated with P (positive) and N (negative). Within this active intermediate circuit 1a the constant direct current lying at the input is changed by way of a Buck-Boost converter 14 via an amplifier 13. Such an intermediate circuit 1a comprises typically an electronic switch 3, an inductance 4, a diode 5 as well as a capacitance 6. The capacitance 6 with this serves for buffering the voltages generated by the motor. As FIG. 1 makes clear the switch 3 of the intermediate circuit 1a according to the prior art is in series with the diode 5, i.e. the switch 3 and the diode 5 lie on the same side of the intermediate circuit 1a.

Figure 2:
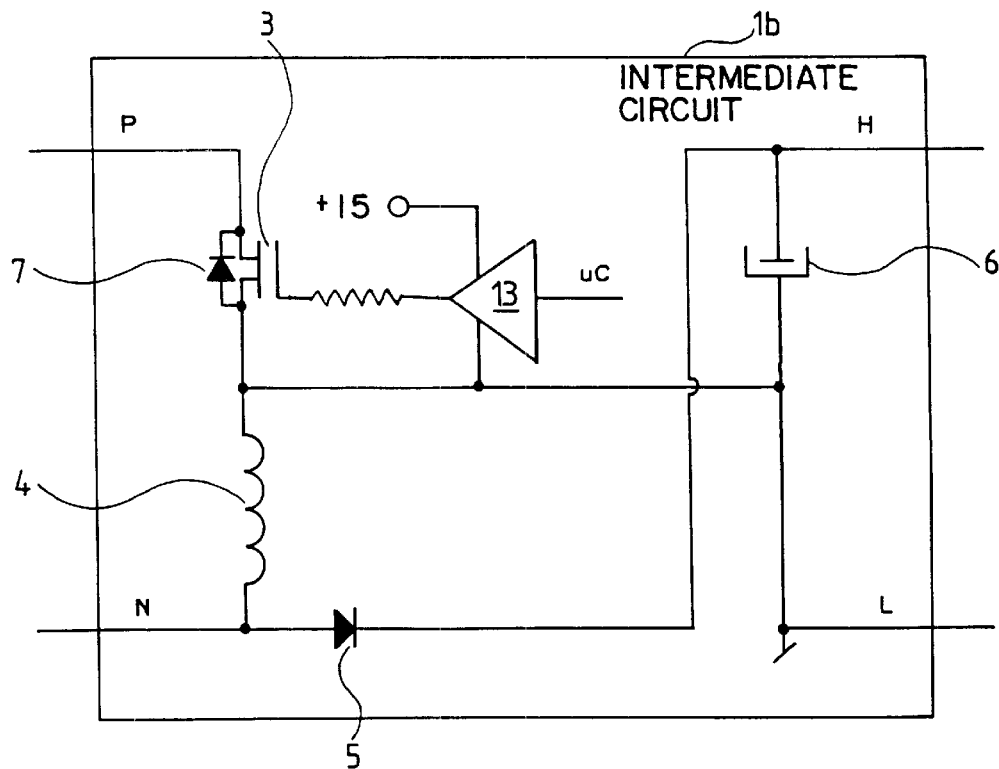
FIG. 2 is a simplified schematic circuit diagram of an intermediate circuit according to the present invention.

FIG. 2 shows an intermediate circuit 1b according to the present invention. In contrast to the prior art the diode 5 on the one side of the intermediate circuit 1b and the switch 3 on the other side of the intermediate circuit 1b. At the same time the arrangement, as shown in FIG. 2, is preferably such that specifically the diodes is arranged on the side conducting the higher potential (High-Side) and the switch 3 is arranged on the side conducting the lower potential (Low-Side). This has considerable advantages with the control activation of the switch 3 more specifically, the turn-on voltage is always constant—specifically +15 Volts in the embodiment example according to FIG. 2, whereas with the circuit arrangement according to FIG. 1 the turn on voltage follows the present actual voltage on the High-Side.

The diode 7 provided in the FIGS. 1 and 2 parallel to the switch 3 is basically dispensable, however with the semiconductor components which today are inexpensively available, in particular silicon components, it is usually provided.

The construction, with respect to circuit technology, of a frequency converter according to the prior art is shown in FIG. 3, comprising an intermediate circuit is 1a a rectifier 2, and an inverse rectifier 8a.

With the frequency converter according to FIG. 3 the supply voltage lying at the input of the rectifier 2 is converted into a direct voltage which prevails at the input of the intermediate circuit 1a, wherein P represents the positive side and N the negative side. Within the intermediate circuit 1a (for details see FIG. 1) there is produced a voltage which is changeable with respect to amplitude and which is supplied to the inverse rectifier 8a, with this the side having the higher potential is indicated with H (High-Side) and the side having the lower potential is indicated with L (Low side). The inverse rectifier 8a is provided for control activating a rotary current motor 9 wherein to each phase of the motor there are allocated two electronic switches 10 of which in each case one is provided for connecting to the higher potential H and one for connection to the lower potential L, for connection to the respective motor phase. The switch 10 is throughout indicated with 10N or 10P, wherein 10N indicates an n-type doping semiconductor, in particular a transistor, and 10P for a p-type doping semiconductor, in particular a transistor. To each switch 10 there is connected a recovery diode 11. The control of this switch 10 is effected exactly as that of the switch 3 in the intermediate circuit via a control and regulation circuit 12a which is not shown here in detail and which according to the construction type is constructed of silicon components on the one hand and discrete components on the other hand. Each switch 10 corresponds to an amplifier 13 wherein to the amplifiers where appropriate there is yet allocated a converter 14 as is provided for example with the amplifiers arranged on the High-Side of the converter 8a as well as with the amplifier in the intermediate circuit 1a according to FIG. 1.

The frequency converter according to the present invention show in to FIG. 4 differs from the previously described design according to the prior art initially by way of the fact that the intermediate circuit 1b is designed according to FIG. 2, furthermore, p-type doping switches 10P are arranged on the High-Side of the inverse rectifier 8b also switch 10 is allocated an amplifier 13 and on the High-Side additionally a converter 14 which likewise are part of a control and regulation circuit 12b and to which there also belongs an amplifier 13 in the intermediate circuit 1b, however in contrast to the intermediate circuit 1a according to the state of the art here no converter 14 is required. In a preferred embodiment, the output voltage of the intermediate circuit 1b is between 30 and 70 volts and is preferably 50V. Furthermore, the output power is preferably in the range including 50 to 300 watts.

Whilst with the embodiment design according to the prior art in each case there are integrated two amplifiers 13, specifically one on the High-Side and one on the Low-Side as well as a converter 14 into a silicon components 15a, with the embodiment according to the present invention according to FIG. 4 all amplifiers 13 on the High-Side are formed by a common silicon component 15b and all amplifiers 13 on the Low-Side are formed by a common silicon component 15b. Since such silicon components, as they are commercially available today, usually contain six amplifiers, the control and regulation unit 12b according to the invention may be constructed with two such silicon components 15b, specifically of one for the Low-Side and of one for the High-Side, wherein the amplifier 13 provided in the intermediate circuit 1b may likewise be formed by one of these two silicon components 15b. The converters 14 on the other hand with the embodiment according to the present invention are designed as discrete components outside the silicon component 15b which likewise is advantageous. If one compares this with a frequency converter according to the prior art according to FIG. 3 then it is to be ascertained that this requires four silicon components 15a (three for the converter control and one for the intermediate circuit control), wherein these silicon components 15a are comparatively expensive and large in construction since they must process individual potentials, specifically that of the Low-Side and that of the High-Side in one and the same component, which is expensive with respect to insulation technology. According to the present invention each silicon component has to process one and the same potential, thus larger potential differences are avoided.

What is claimed is:

1. A frequency converter for an electric motor having at least one phase, comprising:

a rectifier having a rectifier output;

an intermediate circuit with a buck-boost converter having an intermediate circuit input connected to said rectifier output and an intermediate circuit output;

an inverse rectifier having an inverse rectifier input connected to said intermediate circuit output, a high-side conducting a higher potential and a low-side conducting a lower potential, and a pair of electronic switches for each phase of the at least one phase of the electric motor, wherein one switch of said pair of electronic switches is connected to said low side and the other switch of said pair of electric switches is connected to said high side; and a control and regulation circuit operatively arranged for controlling said intermediate circuit such that a magnitude of voltage at said intermediate circuit output is always smaller than a magnitude of voltage at said intermediate circuit input.

2. The frequency converter of claim 1, wherein said one switch of said pair of electronic switches connected to said low side comprises n-type doping semiconductors and said other switch of said pair of electronic switches connected to said high side comprises p-type doping semiconductors.

3. The frequency converter of claim 1, wherein said intermediate circuit comprises a high side connected to a higher potential conductor and a low side connected to a lower potential conductor, said buck-boost converter comprises a buck-boost rectifier diode and an electronic switch, and said buck-boost rectifier diode is connected to one of said high and low sides of said intermediate circuit and said electronic switch is connected to the other one of said high and low sides of said intermediate circuit.

4. The frequency converter of claim 1, wherein a voltage at said intermediate circuit output is within a range including 30 to 70 Volts and a power of the frequency converter is within a range including 50 to 300 Watts.

5. The frequency converter of claim 4, wherein said voltage at said intermediate circuit output comprises 50 Volts.

6. The frequency converter of claim 1, wherein said frequency converter is operatively arranged for pulse-amplitude-modulated control of the electric motor.

* * * * *